G. W. DODSON.
AUTOMOBILE FENDER.
APPLICATION FILED DEC. 7, 1920.
1,375,574.
Patented Apr. 19, 1921.
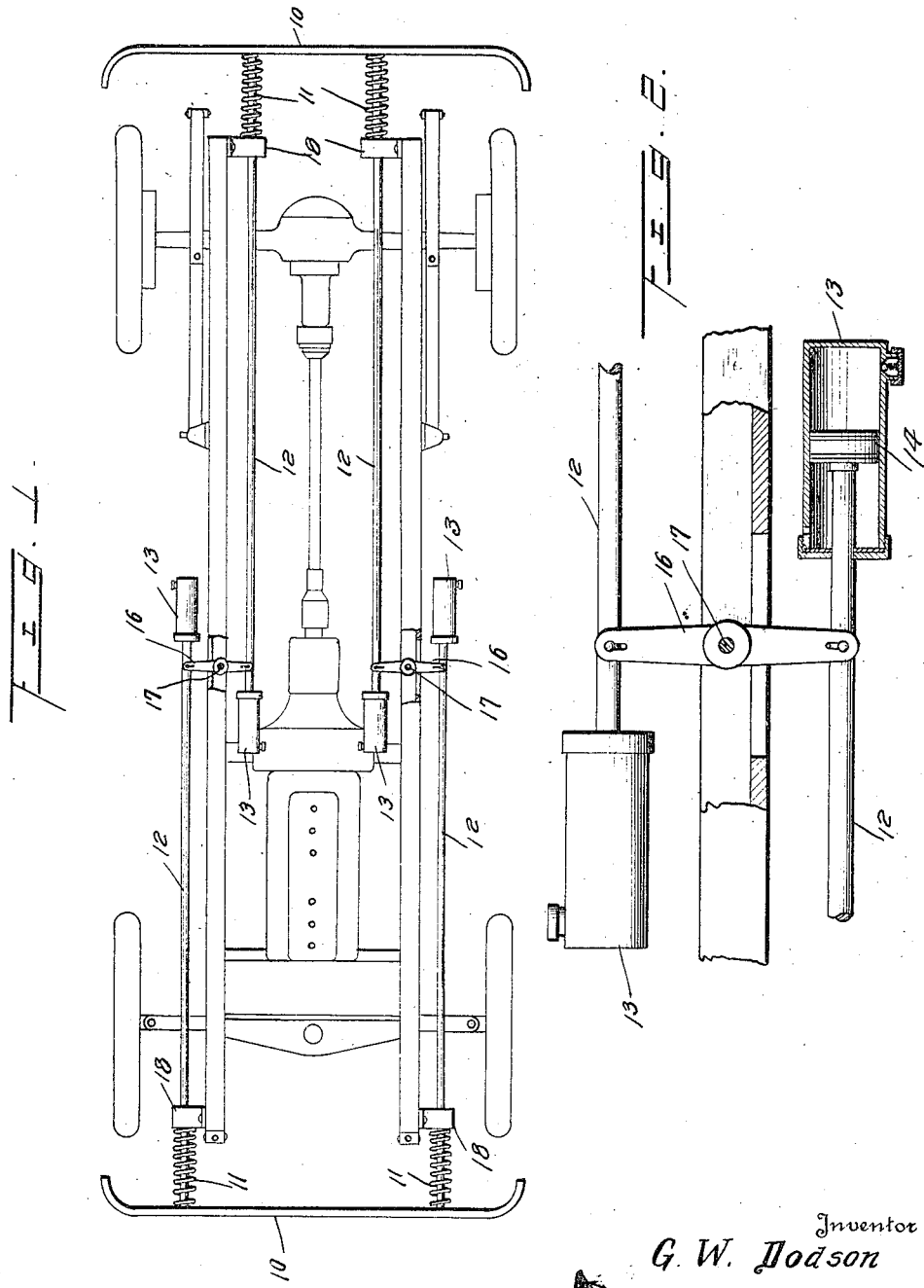
Inventor
G. W. Dodson

UNITED STATES PATENT OFFICE.

GEORGE W. DODSON, OF PITTSBURG, TEXAS.

AUTOMOBILE-FENDER.

1,375,574. Specification of Letters Patent. Patented Apr. 19, 1921.

Application filed December 7, 1920. Serial No. 428,962.

*To all whom it may concern:*

Be it known that I, GEORGE W. DODSON, a citizen of the United States, residing at Pittsburg, in the county of Camp and State of Texas, have invented certain new and useful Improvements in Automobile-Fenders; and I do hereby declare the following to be a full, clear, and exact description of the invention, such as will enable others skilled in the art to which it appertains to make and use the same.

The object of the invention is to provide a relatively simple and efficient cushioning fender for automobiles and like power driven vehicles to serve as a means of breaking or absorbing the shock incident to head-on or rear end collisions to eliminate or minimize the destructive effect thereof upon the vehicle and reduce the likelihood of injury to the occupants thereof; and with this object in view, the invention consists in a construction and combination of parts of which a preferred embodiment is shown in the accompanying drawing, wherein:

Figure 1 is a plan view of an automobile chassis equipped with a fender embodying the invention.

Fig. 2 is a sectional view of one of the intermediate equalizers.

The apparatus consists essentially of transverse fender bars 10 one of which is preferably arranged at each end of the vehicle and is supported by cushioning springs 11, and longitudinally extending rods 12 extending inwardly from said fender bars and connected at their inner ends with equalizing devices 13 which are located in any convenient position at or near the center of the length of the car or vehicle. The springs 11 should be of a sufficient tension to afford a substantial resistance to a shock or jar incident to the contact of the bar with an opposing object, and the inner ends of the rods 12 carry pistons 14 operating in dash pots at the extremities of rockers 16 which are intermediately pivoted to the frame of the car as indicated at 17, to the end that when the fender bar is repressed as by contact with an obstacle to compress the springs yieldingly maintaining the same in its normal position, the operation of the connected pistons in the dash pots in which they move is to still further cushion the shock and at the same time turn the rockers upon their pivots and consequently draw inwardly upon the rods 12 of the companion fender bar at the opposite end of the car, thereby compressing the cushion springs thereof, so that a blow or shock imposed upon one fender bar causes a compression of all of the cushion springs, and at the same time a movement of the several pistons in the cylinders constituting the dash pots with a compensating movement of the rockers, to absorb the movement and correspondingly relieve the car body or jar by checking the movement thereof gradually and then permitting it to assume a position of equilibrium as the cushioning devices return to their normal condition.

The side bars or rods 12 operate in suitable guides 18 and the dash pots, as in accordance with the usual construction of such devices, afford air cushions which materially add to the cushioning effect of the springs and at the same time prevent the abrupt recoil of the springs and hence the reactive effect thereof upon the car body following the impact of the fender bars against the opposing object.

Having thus described the invention what I claim is:—

1. A fender for motor cars having front and rear fender bars provided with opposed cushioning springs and equalizers having rockers with which said fender bars are mutually connected.

2. A fender for motor cars having front and rear fender bars provided with opposed cushioning springs and equalizers having rockers with which said fender bars are mutually connected, and dash pot cushioning means.

3. A fender for motor cars having front and rear end fender bars provided with opposed cushioning springs and longitudinally extending push rods, and equalizers connecting the adjacent ends of the push rods of said fender bars and consisting of intermediately fulcrumed rockers having dash pot connections with the push rods.

In testimony whereof I affix my signature in presence of two witnesses.

GEORGE W. DODSON.

Witnesses:
JOHN H. BLAND,
C. E. BRYSON.